United States Patent
Nagamatsu

(10) Patent No.: US 8,142,317 B2
(45) Date of Patent: Mar. 27, 2012

(54) POWER TRANSMISSION APPARATUS OF HYBRID VEHICLE

(75) Inventor: Shigetaka Nagamatsu, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1144 days.

(21) Appl. No.: 11/921,792

(22) PCT Filed: Apr. 10, 2006

(86) PCT No.: PCT/JP2006/307994
§ 371 (c)(1),
(2), (4) Date: Dec. 7, 2007

(87) PCT Pub. No.: WO2007/000848
PCT Pub. Date: Jan. 4, 2007

(65) Prior Publication Data
US 2010/0041502 A1    Feb. 18, 2010

(30) Foreign Application Priority Data

Jun. 27, 2005 (JP) ................................. 2005-186596
Oct. 7, 2005 (JP) ................................. 2005-294929

(51) Int. Cl.
*F16H 37/06* (2006.01)
(52) U.S. Cl. ......................................................... 475/5
(58) Field of Classification Search ........... 475/5; 477/7
See application file for complete search history.

(56) References Cited

U.S. PATENT DOCUMENTS

| | | | |
|---|---|---|---|
| 5,931,757 A | 8/1999 | Schmidt | |
| 5,935,035 A | 8/1999 | Schmidt | |
| 6,022,287 A | 2/2000 | Klemen et al. | |
| 6,770,005 B2 * | 8/2004 | Aikawa et al. | 475/5 |
| 7,001,296 B2 | 2/2006 | Yamauchi et al. | |
| 2003/0224892 A1 | 12/2003 | Yamauchi et al. | |
| 2005/0115750 A1 | 6/2005 | Takami et al. | |

FOREIGN PATENT DOCUMENTS

| | | |
|---|---|---|
| EP | 0 839 683 A2 | 5/1998 |
| EP | 0 980 994 A2 | 2/2000 |
| EP | 1 142 744 A1 | 10/2001 |
| EP | 1 317 050 A2 | 6/2003 |
| EP | 1 533 165 A2 | 5/2005 |
| JP | A 8-318746 | 12/1996 |
| JP | A-09-132042 | 5/1997 |
| JP | A-2000-062483 | 2/2000 |
| JP | A-2000-069611 | 3/2000 |
| JP | A-2000-135931 | 5/2000 |
| JP | A-2001-055052 | 2/2001 |
| JP | A-2001-138752 | 5/2001 |
| JP | A 2001-246953 | 9/2001 |
| JP | A 2002-274201 | 9/2002 |

(Continued)

*Primary Examiner* — J. Allen Shriver, II
*Assistant Examiner* — Erez Gurari
(74) *Attorney, Agent, or Firm* — Oliff & Berridge, PLC

(57) ABSTRACT

A drive unit includes an input shaft connected to an engine, a power conversion unit including rotating electric machines and planetary gears to convert power applied from the input shaft, and gears as the power output unit transmitting power output from the power conversion unit to a drive shaft of the vehicle. Planetary gears of the power conversion unit are formed separately from the gears. The rotating electric machines of the power conversion unit are stored in a unitary case.

13 Claims, 10 Drawing Sheets

FOREIGN PATENT DOCUMENTS

| | | |
|---|---|---|
| JP | A-2003-343667 | 12/2003 |
| JP | A 2004-66898 | 3/2004 |
| JP | A-2004-204995 | 7/2004 |
| JP | A 2004-340010 | 12/2004 |
| JP | A-2006-264583 | 10/2006 |
| WO | WO 2005/000620 A1 | 1/2005 |

* cited by examiner

POWER TRANSMISSION APPARATUS OF HYBRID VEHICLE

TECHNICAL FIELD

The present invention relates to power transmission apparatuses of hybrid vehicles, particularly a power transmission apparatus of a hybrid vehicle including a rotating electric machine.

BACKGROUND ART

A power transmission apparatus mounted on a hybrid vehicle is conventionally known.

For example, Japanese Patent Laying-Open No. 2002-274201 (Patent Document 1) discloses a power transmission apparatus including a power synthesizing mechanism connected to an electric motor and a generator to allow power transmission, and a transmission mechanism that changes the rotational speed of the electric motor for transmission to the power synthesizing mechanism. The ring gear in the power synthesizing mechanism and transmission mechanism is formed at the inner circumference of the same annular member.

Japanese Patent Laying-Open No. 2004-66898 (Patent Document 2) discloses a hybrid driving device including first and second electric motors and a planetary gear for power distribution. The planetary gear for power distribution includes a first rotary element to which the engine output is transmitted, a second rotary element that rotates in cooperation with the first electric motor, and a third rotary element that rotates in cooperation with the output unit. The transmission device is provided between the second electric motor and the output unit.

Japanese Patent Laying-Open No. 2004-340010 (Patent Document 3) discloses a power transmission apparatus of a hybrid vehicle including an engine, first and second motor generators, and a power split device. In this apparatus, the engine, the output gear wheel, and the two motor generators are arranged in this order.

Japanese Patent Laying-Open No. 2001-246953 (Patent Document 4) discloses a hybrid driving device including an engine, a generator, a planetary gear connecting the same, an electric motor, and a differential mechanism. In this hybrid driving device, the output unit of the planetary gear is separated from the output unit of the electric motor.

Japanese Patent Laying-Open No. 8-318746 (Patent Document 5) discloses a hybrid unit mounted on a hybrid vehicle. In this hybrid unit, the bearing that supports the rotor is provided at the outer circumference of the shaft that is arranged concentric with the rotor.

The power transmission apparatus disclosed in Patent Document 1 has the power synthesizing mechanism and transmission mechanism formed integrally. Motive power is output towards the output shaft from the annular member (ring gear) constituting the power synthesizing mechanism and transmission mechanism. Since the annular member is provided between the electric motor and the generator, it is difficult to form the housing of the electric motor and the housing of the generator integrally. Further, a bearing of a relatively large diameter must be provided in order to support the annular member. Accordingly, eccentricity and unbalance will readily occur at the annular member that is an internal component. This causes increased noise to induce the possibility of variation in intensity. Critical techniques in the production stage are required to suppress such problems, which will degrade the productivity of power transmission apparatuses. It can be said that the configuration of solving such problems is not sufficiently disclosed in Patent Documents 2-5.

There is also a problem that down-sizing of the drive unit is inhibited for the power train in the case where a plurality of rotating electric machines are provided and the bearing to support the rotors thereof is attached to a fixture support in the housing. This is because the space to dispose the fixture support and the bearing at both sides of each rotating electric machine is required. In the case where the aforementioned support is provided so as to protrude inwards of the rotor core from the standpoint of reducing the entire length of the drive unit, the support must be formed in a complicated configuration, resulting in degradation of the productivity of the drive unit. It can be said that a configuration of solving this problem is not sufficiently disclosed in Patent Documents 1-5. For example, the unit disclosed in Patent Document 5 has the bearing that supports the rotor of the rotating electric machine attached to the support member affixed to the housing.

DISCLOSURE OF THE INVENTION

An object of the present invention is to provide a power transmission apparatus of a hybrid vehicle with high productivity.

According to an aspect of the present invention, a power transmission apparatus of a hybrid vehicle includes an input shaft connected to an internal combustion engine, a power conversion unit including first and second rotating electric machines and a planetary gear for converting power applied from the input shaft, and a power output unit transmitting the power from the power conversion unit to the drive shaft of the vehicle. The power conversion unit and the power output unit are formed as separate components. The first and second rotating electric machines of the power conversion unit are stored in a unitary housing.

By providing the power conversion unit and the power output unit as separate components, a bearing of a large diameter for supporting the composite gear required when configured in integral form becomes dispensable. As a result, the eccentricity and unbalance of the housing internal components can be readily suppressed. By forming the housing of the first and second rotating electric machines integrally, it is no longer necessary to provide separate housings for the plurality of rotating electric machines, and the effect of suppressing eccentricity and unbalance set forth above can be further improved. As a result, the productivity of the power transmission apparatus is improved.

In the present power transmission apparatus of a hybrid vehicle, a power output unit is preferably arranged between the internal combustion engine and the power conversion unit.

By disposing the power output unit between the rotating electric machine and the internal combustion engine, the housing configuration of the rotating electric machine can be prevented from becoming smaller depending upon the configuration of the internal combustion engine. As a result, reduction in the stator diameter can be suppressed.

Preferably in the present power transmission apparatus of a hybrid vehicle, the first rotating electric machine and the second rotating electric machine include a first rotation shaft and a second rotation shaft, respectively. The input shaft is arranged at the inner circumferential side of the first and second rotation shafts. A bearing is provided between the input shaft and the first and second rotation shafts.

Accordingly, the space to arrange the bearing that supports the rotor and the support member of such a bearing is no longer required. Therefore, the power transmission apparatus of a hybrid vehicle can be reduced in size. Further, it is not necessary to provide a support member of a complicated form. Therefore, the productivity is improved.

Preferably, the power transmission apparatus of a hybrid vehicle further includes another bearing provided between the housing and at least one of the first and second rotation shafts.

Accordingly, the first and second rotation shafts can be supported directly by the housing. This means that external force acting on the input shaft from the first and second rotation shafts can be reduced. Thus, the maximum rotational speed of the first and second rotating electric machines can be improved while suppressing excessive increase in the diameter of the input shaft.

In the present power transmission apparatus of a hybrid vehicle, the housing preferably includes a projection protruding from an inner wall of the housing at a site between the first and second rotating electric machines. The another bearing set forth above is provided at the projection.

Accordingly, the rigidity of the housing is improved and the noise during operation of the power transmission apparatus can be reduced.

In the present power transmission apparatus of a hybrid vehicle, the first and second rotation shafts preferably have a straight configuration. The first and second rotation shafts and rotors of the first and second rotating electric machines are respectively spline-fitted.

Accordingly, the configuration of the members forming the power transmission apparatus is prevented from becoming complicated. As a result, the productivity of the power transmission apparatus is improved.

As used herein, "straight configuration" refers to a configuration in which the axial cross section is constant at least at the region where the rotor is fitted.

Preferably in the power transmission apparatus of a hybrid vehicle set forth above, the power conversion unit includes a power split device including the planetary gear, and a reduction mechanism. The planetary gear is connected to the input shaft, the first rotating electric machine, and the power output unit. The reduction mechanism is provided at a power transmission path between the second rotating electric machine and the power output unit.

According to an aspect of the present invention, a planetary carrier of the planetary gear in the power split device is connected to the input shaft, and a ring gear of the planetary gear is connected to the power output unit.

According to another aspect of the present invention, the ring gear of the planetary gear in the power split device is connected to the input shaft, and the planetary carrier of the planetary gear is connected to the power output unit.

In accordance with any of the aspects set forth above, a power split device of a simple structure can be obtained.

Preferably in the power transmission apparatus of a hybrid vehicle, the reduction mechanism includes another planetary gear. In accordance with an aspect of the present invention, this another planetary gear is preferably affixed to the housing at the axial central region of the power conversion unit. Accordingly, the rotation shaft can be supported more firmly. According to another aspect of the present invention, the ring gear of the another planetary gear is preferably affixed to the housing. Accordingly, a higher reduction gear ratio can be achieved.

Preferably in the power transmission apparatus of a hybrid vehicle, the output of the power split device and the output of the reduction mechanism are transmitted individually to the power output unit.

Accordingly, the torque ratio of the power split device to the reduction mechanism and the reduction gear ratio of the entire power conversion unit can be set arbitrarily.

Preferably, the power transmission apparatus of a hybrid vehicle further includes an output shaft connected to the planetary gear and the power output unit, and provided concentric with the input shaft.

Accordingly, the power conversion unit and the power output unit can be provided separately without inhibiting reduction of the power transmission apparatus in size.

According to another aspect of the present invention, a power transmission apparatus of a hybrid vehicle includes an input shaft connected to an internal combustion engine, a power conversion unit including first and second rotating electric machines for converting the power applied from the input shaft, and a power output unit transmitting the power from the power conversion unit to a drive shaft of the vehicle. The first rotating electric machine and the second rotating electric machine include a first rotation shaft and the second rotation shaft, respectively. The input shaft is arranged at the inner circumferential side of the first and second rotation shafts. A bearing supporting the first and second rotation shafts is provided between the input shaft and the first and second rotation shafts.

According to the configuration set forth above, it is not necessary to provide a bearing and a supporting member thereof between the first and second rotating electric machines, allowing the power transmission apparatus of a hybrid vehicle to be reduced in size. Further, the productivity of the power transmission apparatus of a hybrid vehicle is improved since it is not necessary to provide a support member of a complicated configuration.

Thus, the present invention is advantageous in that the productivity of a power transmission apparatus of a hybrid vehicle can be improved.

The foregoing and other objects, features, aspects and advantages of the present invention will become more apparent from the following detailed description of the present invention when taken in conjunction with the accompanying drawings.

BEST MODES FOR CARRYING OUT THE INVENTION

Figure 1:
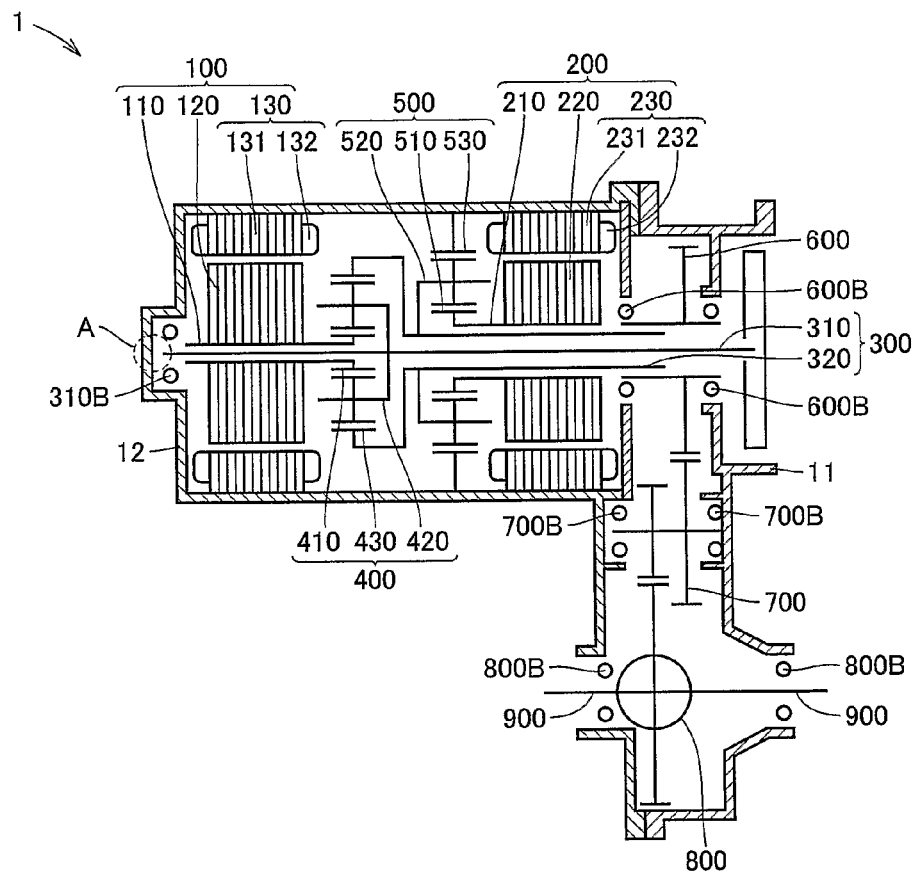
FIG. 1 is a sectional view of a power transmission apparatus of a hybrid vehicle according to a first embodiment of the present invention.

Embodiments of a power transmission apparatus of a hybrid vehicle of the present invention will be described hereinafter. The same or corresponding components have the same reference characters allotted, and description thereof will not be repeated.

First Embodiment

Referring to FIG. 1, a drive unit 1 identified as a power transmission apparatus of a hybrid vehicle according to the first embodiment includes rotating electric machines 100 and 200, a rotation shaft 300, a planetary gear 400 for power distribution, a planetary gear 500 for reduction of rotating electric machine 200, gears 600 and 700, a differential mechanism 800, and a drive shaft accepting unit 900. Rotating electric machines 100 and 200, rotation shaft 300, planetary gears 400 and 500, gears 600 and 700, and differential mechanism 800 are located in a housing that includes a cover 11 and a case 12.

Rotating electric machine 100 identified as the first rotating electric machine includes a rotation shaft 110 identified as the first rotation shaft provided rotatable with respect to the housing, a rotor 120 identified as the first rotor attached to rotation shaft 110, and a stator 130 identified as the first stator. Stator 130 includes a stator core 131 formed as a multilayer of electromagnetic steel plates. A stator coil 132 is wound around stator core 131. The terminal of stator coil 132 is connected to a feeder cable from an external power supply. Accordingly, the external power supply is electrically connected with stator coil 132.

Rotating electric machine 200 identified as the second rotating electric machine includes a rotation shaft 210 identified as the second rotation shaft provided rotatable with respect to the housing, a rotor 220 identified as the second rotor attached to rotation shaft 210, and a stator 230 identified as the second stator. Stator 230 includes a stator core 231 formed as a multilayer of electromagnetic steel plates. A stator coil 232 is wound around stator core 231. The terminal of stator coil 232 is connected to a feeder cable from an external power supply. Accordingly, the external power supply is electrically connected with stator coil 232.

Rotation shaft 300 includes an input shaft 310 applying the power from an engine identified as the internal combustion engine to drive unit 1, and an output shaft 320 to which the outputs from planetary gears 400 and 500 are transmitted. Input shaft 310 is provided at the inner circumferential side of rotation shafts 110 and 210 of rotating electric machines 100 and 200 and output shaft 320. Output shaft 320 is provided at the inner circumferential side of rotation shaft 210 of rotating electric machine 200. Rotation shafts 110 and 210 and input/output shafts 310 and 320 are arranged concentrically, and connected to each other via planetary gears 400 and 500. Accordingly, the power input via input shaft 310 from the engine is converted to be transmitted to output shaft 320. In other words, rotating electric machines 100 and 200 and planetary gears 400 and 500 constitute the power conversion unit that converts and transmits to output shaft 320 the power from input shaft 310. Output shaft 320 is spline-fitted with gear 600.

The supporting mechanism of rotation shafts 110 and 210 as well as input/output shafts 310 and 320 will be described afterwards.

Planetary gear 400 includes a sun gear 410, a planetary carrier 420, and a ring gear 430. Sun gear 410 is coupled to rotation shaft 110 of rotating electric machine 100. Planetary carrier 420 is coupled to input shaft 310. Ring gear 430 is coupled to output shaft 320. Accordingly, the engine power transmitted via input shaft 310 can be transmitted in a split manner between rotating electric machine 100 and output shaft 320.

Planetary gear 500 (another planetary gear) includes a sun gear 510, a planetary carrier 520 and a ring gear 530. Sun gear 510 is coupled to rotation shaft 210 of rotating electric machine 200. Planetary carrier 520 is coupled to output shaft 320. Ring gear 530 is fixed to the housing. Accordingly, the output of rotating electric machine 200 can be transmitted to output shaft 320 while reducing the output.

Gears 600 and 700 are attached to the housing in a rotatable manner via bearings 600B and 700B. Differential mechanism 800 includes a ring gear, a pinion gear, and a side gear (all not shown). The ring gear is attached rotatably to the housing via a bearing 800B. The operation of differential mechanism 800 is well-known, and details thereof will not be described here.

Figure 2:
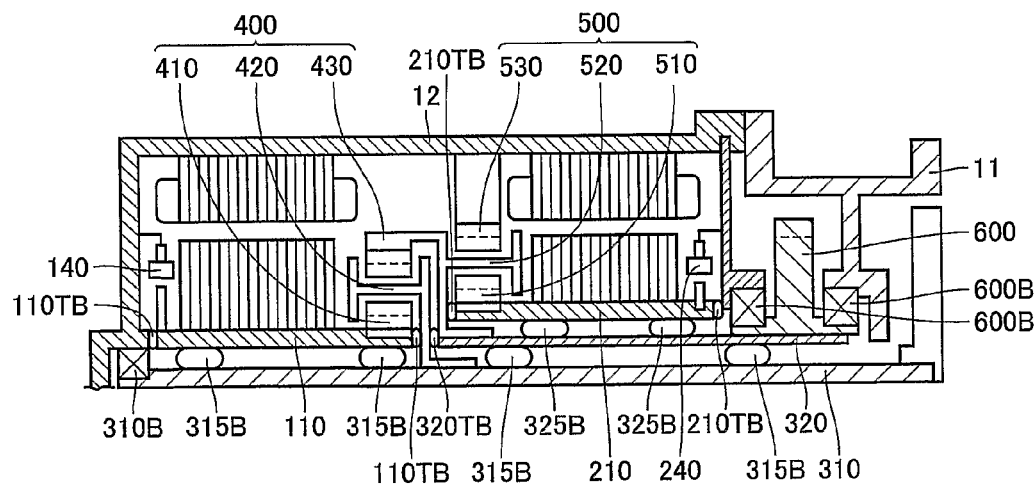
FIG. 2 is a sectional view of the power transmission apparatus of a hybrid vehicle shown in FIG. 1 in more detail.

FIG. 2 is a sectional view of drive unit 1 of FIG. 1 showing in more detail the neighborhood of rotation shaft 300. Referring to FIG. 2, rotation sensors 140 and 240 are provided to identify the rotation status of the rotors in rotating electric machines 100 and 200.

Attention is focused on the shaft support mechanism in the direction of the diameter of the shaft. Input shaft 310 has one end supported by a bearing 310B. A bearing 315B is provided between input shaft 310 and the shafts located at the outer circumferential side thereof, i.e. output shaft 320 and rotation shaft 110. A bearing 325B is provided between output shaft 320 and rotation shaft 210 located at the outer circumferential side thereof. Rotation shafts 110 and 210 are connected to planetary gears 400 and 500, respectively. One end of output shaft 320 and gear 600 attached to output shaft 320 are supported in a rotatable manner to the housing via bearing 600B. By the configuration set forth above, rotation shafts 110 and 210 and input/output shafts 310 and 320 are maintained on the same axis, supported in a rotatable manner. In other words, in drive unit 1, bearings 315B and 325B supporting rotation shafts 110 and 210 of rotating electric machines 100 and 200, respectively, are provided between input shaft 310 and respective rotation shafts 110 and 210. By such a configuration, drive unit 1 can be reduced in size by eliminating the space required to install the bearings that support rotation shafts 110 and 210 and the space to install the support member of the bearing. Further, the productivity of drive unit 1 is improved since a bearing support member of a complicated configuration does not have to be provided.

Attention is now focused on the shaft support mechanism in the axial direction of the shaft. Thrust bearings 110TB, 210TB and 320TB are provided, supporting rotation shafts 110 and 210 and output shaft 320, respectively.

Referring to FIG. 1 again, the vehicle runs by the motive power mainly from the engine in a normal running mode. The power applied from the engine via input shaft 310 is split to rotation shaft 110 of rotating electric machine 100 and to output shaft 320 by planetary gear 400 identified as the power split device. The power transmitted to output shaft 320 is transmitted to drive shaft accepting unit 900 via differential mechanism 800 from gears 600 and 700. The motive power transmitted to drive shaft accepting unit 900 is conveyed to the wheel (not shown) via a drive shaft (not shown) as a rotary force to drive the vehicle. In other words, gears 600 and 700 constitute the power output unit that transmits the power output from the power conversion unit set forth above via output shaft 320 to the drive shaft of the vehicle. Rotating electric machine 100 is driven by the power transmitted to rotation shaft 110. In this case, rotating electric machine 100 operates as a generator. Rotating electric machine 200 identified as an electric motor is driven by the power generated by rotating electric machine 100. The power from rotating electric machine 200 is transmitted to output shaft 320 via planetary gear 500 identified as the reduction mechanism to assist the engine power. At the time of increasing the speed of the vehicle, the engine rotation speed is boosted and rotating electric machine 200 is driven by the electric power generated by rotating electric machine 100 to obtain further motive power.

At the time of starting the vehicle or when driving in a light load mode, the vehicle is driven by the motive power from rotating electric machine 200. In this case, the event of the engine being stopped and the event of generating power by driving rotating electric machine 100 by the engine are identified.

In a regenerative braking mode of the vehicle, rotating electric machine 200 is driven via drive shaft accepting unit 900, differential mechanism 800, and gears 700 and 600 by the rotary force from the driving wheels. In this case, rotating electric machine 200 operates as a power generator. The electric power generated by rotating electric machine 200 is stored in a battery.

When the power conversion unit and the power output unit are formed integrally, the ring gear of the planetary gear, for example, is commonly used as the counter gear. This means that the gear is increased in diameter and the shape thereof will be rendered complicated. As a result, machine working precision as well as accurate assembly and the like will be required for the purpose of reducing the noise, leading to degradation in the productivity of drive unit 1. In view of the foregoing, planetary gears 400 and 500 included in the power conversion unit are formed as separate components from gears 600 and 700 identified as the power output unit, as described above, in drive unit 1 of the first embodiment. Therefore, gear noise can be suppressed without requiring accurate machine working and assembly of planetary gears 400 and 500 and bearing 700B. Thus, the productivity of drive unit 1 is improved.

It is to be also noted that the configuration of each member is prevented from becoming complicated in drive unit 1. For example, rotation shafts 110 and 210 of rotating electric machines 100 and 200 have a straight configuration, and rotation shafts 110 and 210 are spline-fitted with rotors 120 and 220. Further, sun gear 410 of planetary gear 400 is formed integrally with rotation shaft 110. Sun gear 510 of planetary gear 500 is formed integrally with rotation shaft 210. As a result, the productivity of drive unit 1 is improved.

In drive unit 1, a plurality of rotating electric machines 100 and 200 are stored in a unitary case 12. Accordingly, separate housings for rotating electric machines 100 and 200 do not have to be provided. Further, the eccentricity and unbalance of rotating electric machines 100 and 200 can be readily suppressed. As a result, the productivity of drive unit 1 is improved.

In drive unit 1, gears 600 and 700 identified as the power output unit is provided between the engine (located at the right side to drive unit 1 in FIG. 1) and rotating electric machine 200. Therefore, the configuration of the housing in which rotating electric machine 200 is stored will not be affected by the configuration of the engine. The inner diameter thereof can be set arbitrarily. This means that a relatively large diameter for the stator in rotating electric machine 200 can be set to allow reduction in the layered thickness of stator core 231. By increasing the diameter of the stator of rotating electric machine 100 in accordance with the diameter of the stator of rotating electric machine 200, the thickness of the layers of stator core 131 can be reduced. As a result, the fabrication cost is reduced.

In drive unit 1, ring gear 530 in planetary gear 500 identified as the reduction mechanism is fixed to the housing. Therefore, a higher reduction gear ratio can be obtained as compared to the case where planetary carrier 520 is affixed to the housing. As a result, the layered thickness of stator core 231 at rotating electric machine 200 can be further reduced.

In drive unit 1, input shaft 310 is formed so as to reach the oil supply unit (portion A in FIG. 1) from the oil pump (not shown). An oil channel (not shown) is provided at the center of the axis of input shaft 310. An oil discharge port (not shown) is provided from the oil channel up to the side face of input shaft 310. The lubricant flowing through the oil channel is emitted by the centrifugal force from the oil discharge port towards the peripheral components (for example, planetary gears 400 and 500) in accordance with the rotation of input shaft 310.

In drive unit 1, ring gear 530 is fixed to case 12 between rotating electric machines 100 and 200. Accordingly, rotation shaft 300 is supported at the axial center region of the power conversion unit. Therefore, the supporting rigidity of the shaft is improved.

Figure 3:
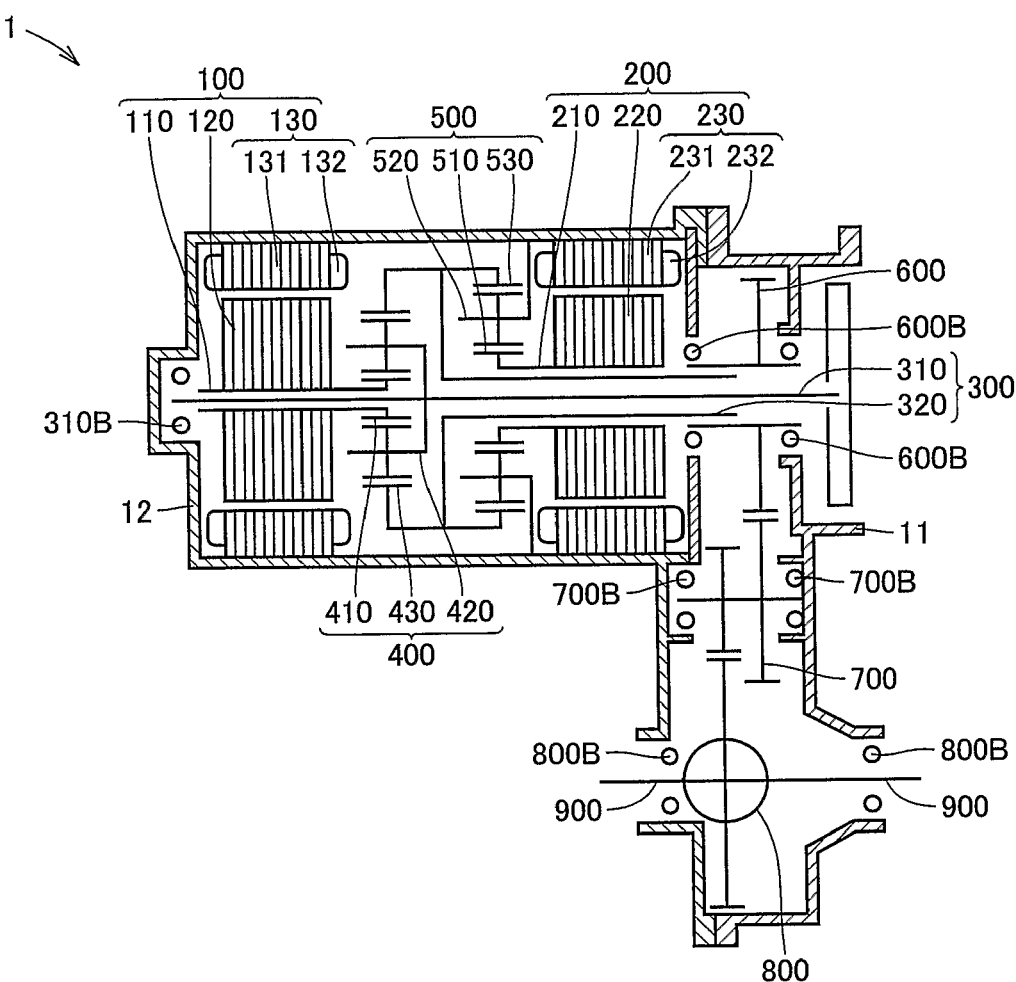
FIG. 3 is a sectional view of a modification of the power transmission apparatus of a hybrid vehicle of the first embodiment.

FIG. 3 is a sectional view of a modification of drive unit 1 of the present embodiment. Referring to FIG. 3, planetary carrier 520 of planetary gear 500 is fixed to case 12 in the present modification, and ring gear 530 is connected to output shaft 320. The "reduction mechanism" of rotating electric machine 200 can be obtained by such a configuration.

In summarization, drive unit 1 of the present embodiment includes input shaft 310 connected to the engine, a "power conversion unit" with rotating electric machines 100 and 200 and planetary gears 400 and 500 to convert the power applied from input shaft 310, and gears 600 and 700 identified as the power output unit that convey the power output from the power conversion unit to the drive shaft of the vehicle. Planetary gears 400 and 500 of the power conversion unit are formed as separate components from gears 600 and 700, and rotating electric machines 100 and 200 of the power conversion unit are stored in a unitary case 12. Drive unit 1 further includes an output shaft 320 provided concentric with input shaft 310, and connected to planetary gears 400 and 500 and gear 600. Gears 600 and 700 are provided between the engine and rotating electric machines 110 and 200.

Rotating electric machine 100 includes a rotation shaft 110 and rotating electric machine 200 includes a rotation shaft 210. Input shaft 310 is arranged at the inner circumferential side of rotation shafts 110 and 210. Bearings 315B and 325B supporting rotation shafts 110 and 210 are provided between input shaft 310 and rotation shafts 110 and 210.

Planetary gear 400 constitutes the power split device. Planetary gear 500 constitutes the reduction mechanism. Planetary gear 400 is connected to rotating electric machine 100, input shaft 310, and gear 600. Specifically, sun gear 410 is formed integrally with rotation shaft 110 of rotating electric machine 100, and planetary carrier 420 is connected to input shaft 310. Ring gear 430 is connected to gear 600 via output shaft 320. Planetary gear 500 is provided at a power transmission path between rotating electric machine 200 and gear 600.

By the configuration set forth above in accordance with the present invention, the productivity of drive unit 1 can be improved.

Second Embodiment

Figure 4:
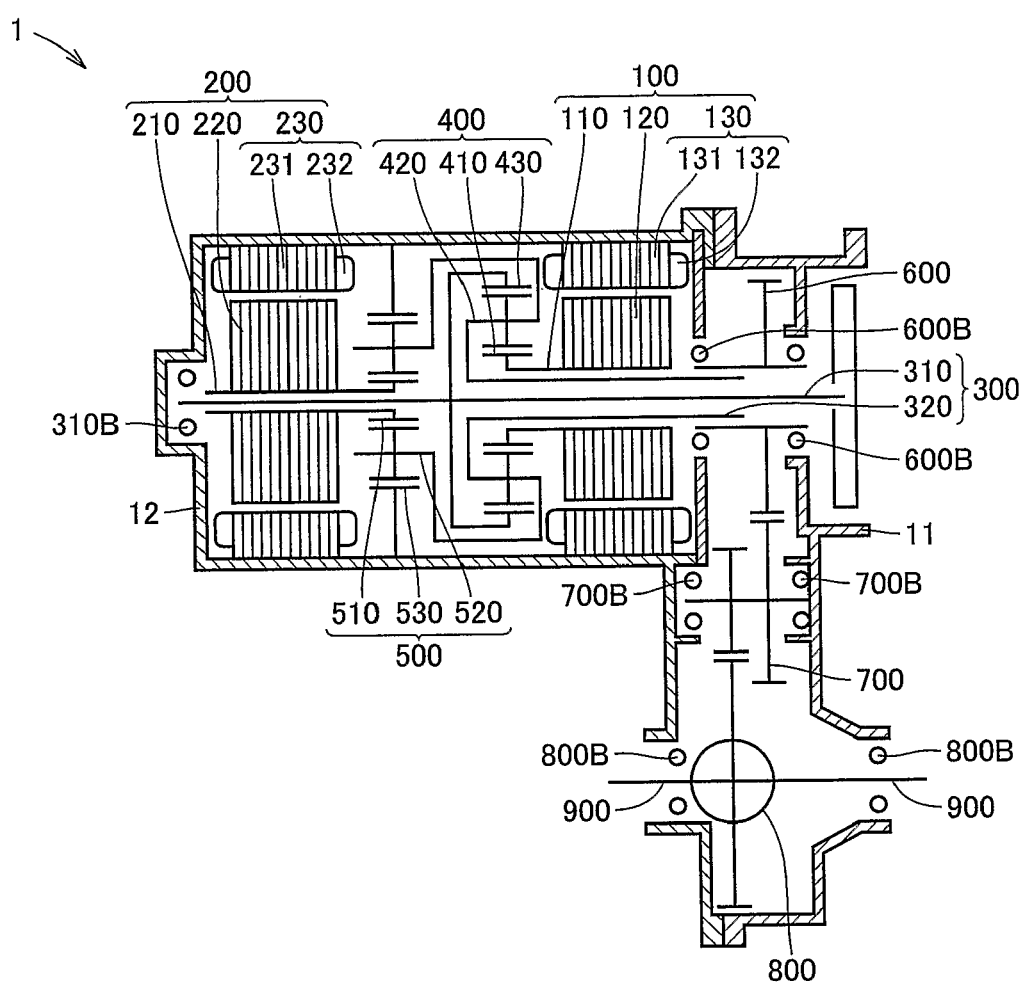
FIG. 4 is a sectional view of a power transmission apparatus of a hybrid vehicle according to a second embodiment of the present invention.

Referring to FIG. 4, a drive unit 1 according to a second embodiment of the present invention is a modification of drive unit 1 of the first embodiment. Drive unit 1 of the second embodiment is characterized in that each of the components constituting the power conversion unit is arranged in the order of rotating electric machine 200, planetary gear 500, planetary gear 400, and rotating electric machine 100 from the rear side of case 12 (the left side in FIG. 4). Another feature is that ring gear 430 of planetary gear 400 is connected to input shaft 310, and planetary carrier 420 is connected to output shaft 320. By such a configuration, a power split device of distributing the power from input shaft 310 can be provided, likewise the first embodiment. Further, sun gear 510 of planetary gear 500 is connected to rotation shaft 210 of rotating electric machine 200, and planetary carrier 520 is connected to output shaft 320 via planetary carrier 420. Ring gear 530 is fixed to case 12. Accordingly, the reduction mechanism of rotating electric machine 200 can be implemented.

Figure 5:
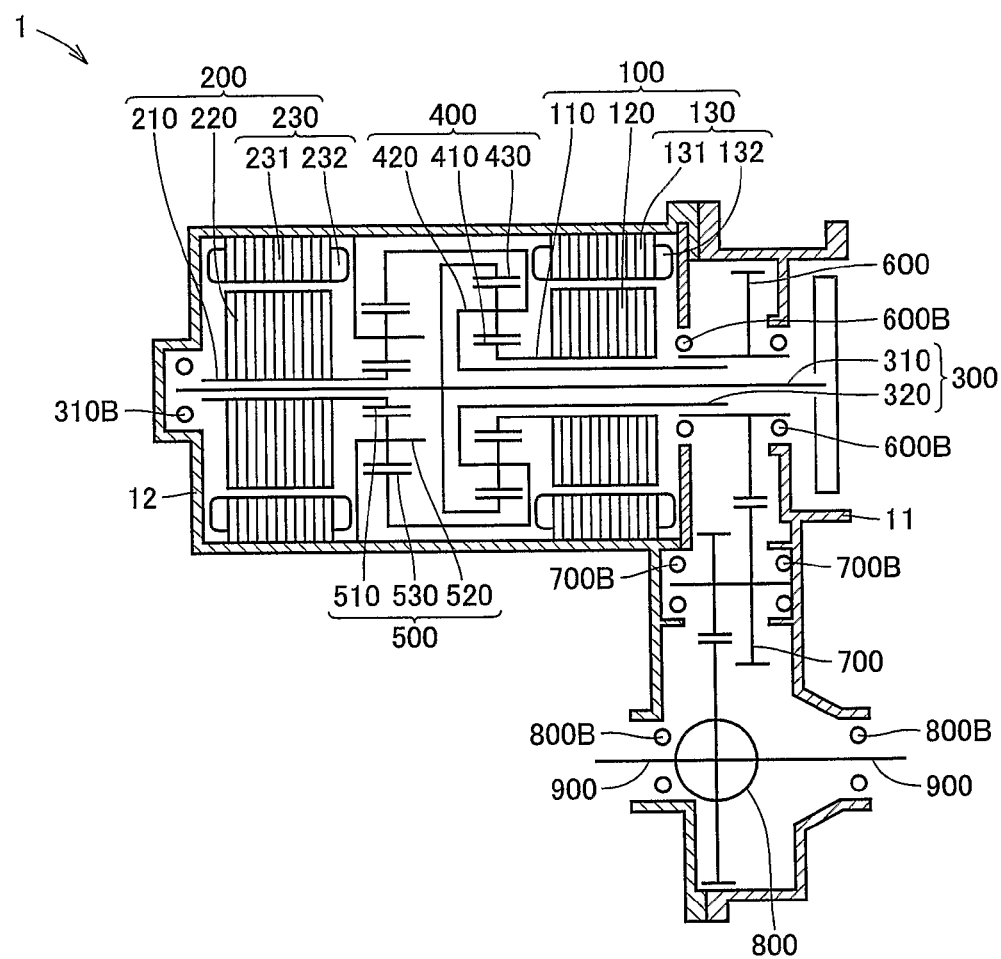
FIG. 5 is a sectional view of a modification of the power transmission apparatus of a hybrid vehicle according to the second embodiment of the present invention.

FIG. 5 is a sectional view of a modification of drive unit 1 of the second embodiment. In this modification, planetary carrier 520 of planetary gear 500 is affixed to case 12. Ring gear 530 is connected to output shaft 320 via planetary carrier 420. By such a configuration, the reduction mechanism of rotating electric machine 200 can be implemented.

The productivity of drive unit 1 can be improved in accordance with the configuration shown in FIGS. 4 and 5, likewise the first embodiment.

Third Embodiment

Figure 6:
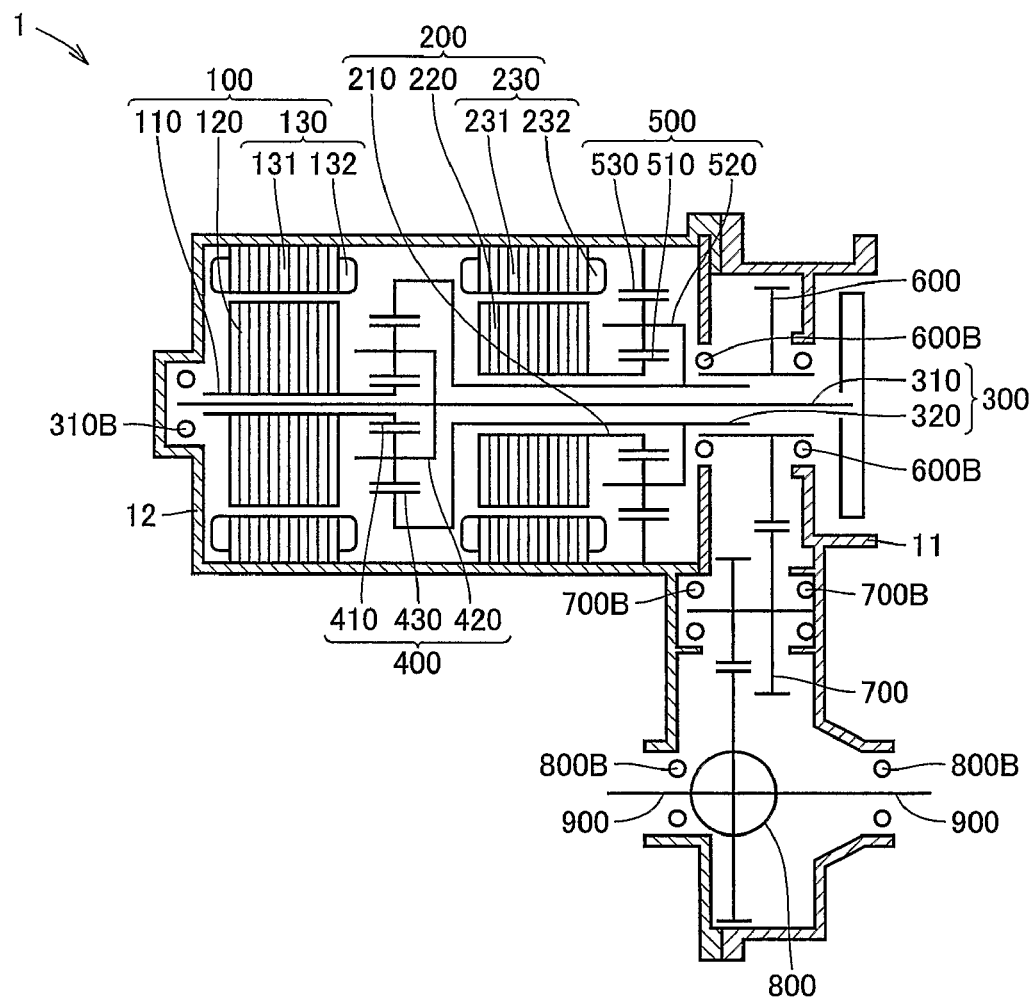
FIG. 6 is a sectional view of a power transmission apparatus of a hybrid vehicle according to a third embodiment of the present invention.

Referring to FIG. 6, a drive unit 1 of the third embodiment is a modification of drive unit 1 of the first and second embodiments. As shown in FIG. 6, drive unit 1 of the third embodiment is characterized in that each of components constituting the power conversion unit is arranged in the order of rotating electric machine 100, planetary gear 400, rotating electric machine 200, and planetary gear 500 from the rear side of case 12 (the left side in FIG. 6). The connection of sun gear 410 of planetary gear 400 to rotation shaft 110 of rotating electric machine 100, the connection of planetary carrier 420 to input shaft 310, and the connection of ring gear 430 to output shaft 320 are similar to the connections in the first embodiment. The power split device of distributing the power from input shaft 310 to rotating electric machine 100 and output shaft 320, likewise the first and second embodiments, is implemented. Sun gear 510 of planetary gear 500 is connected to rotation shaft 210 of rotating electric machine 200. Planetary carrier 520 is connected to output shaft 320. Ring gear 530 is affixed to case 12. Thus, the reduction mechanism of rotating electric machine 200 is implemented.

Figure 7:
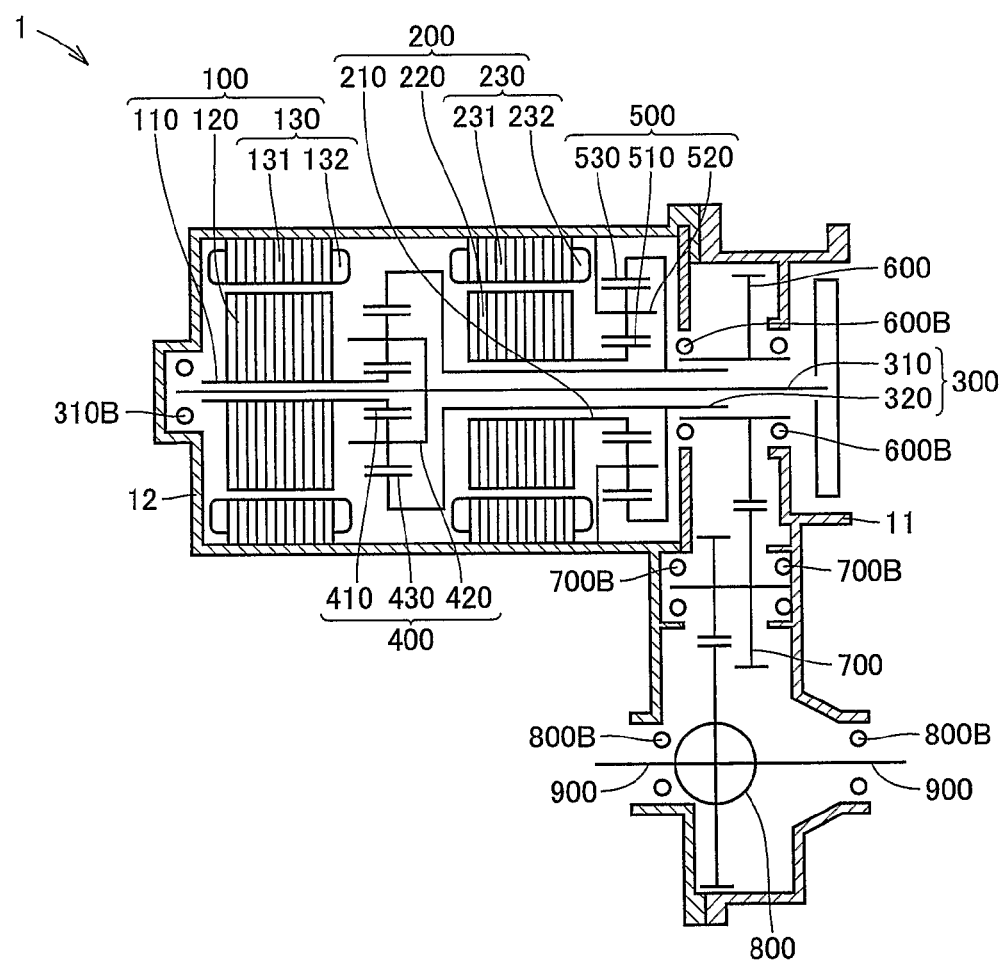
FIG. 7 is a sectional view of a modification of the power transmission apparatus of a hybrid vehicle of the third embodiment.

FIG. 7 is a sectional view of a modification of drive unit 1 of the third embodiment. In the present modification, planetary carrier 520 of planetary gear 500 is affixed to case 12, and ring gear 530 is connected to output shaft 320. The reduction mechanism of rotating electric machine 200 can be implemented by such a configuration.

The productivity of drive unit 1 can be improved in accordance with the configurations of FIGS. 6 and 7, likewise the first and second embodiments.

Fourth Embodiment

Figure 8:
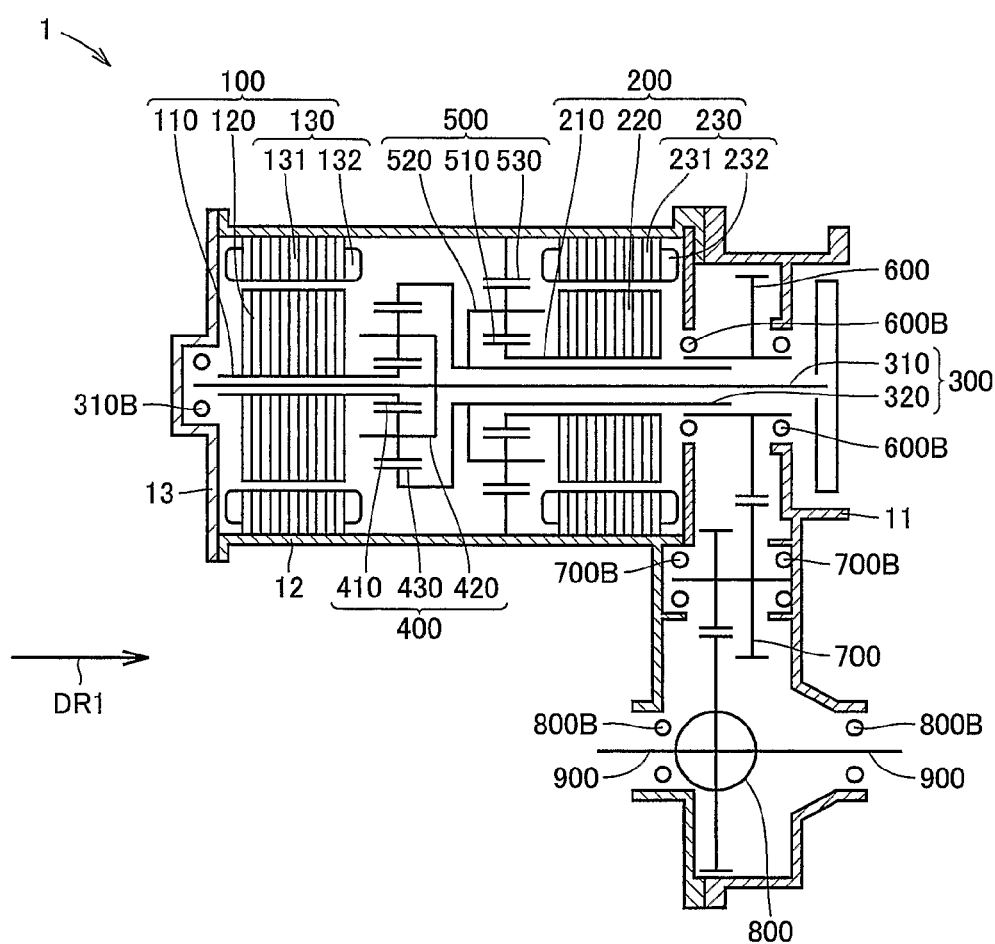
FIGS. 8 and 9 are sectional views of a power transmission apparatus of a hybrid vehicle according to a fourth embodiment and a fifth embodiment, respectively, of the present invention.

Referring to FIG. 8, drive unit 1 of the fourth embodiment is a modification of drive unit 1 of the first to third embodiments, and is characterized in that a cover 11, a case 12, and a cover 13 constitute the housing. Accordingly, rotating electric machines 100 and 200 can be inserted into case 12 even from the direction indicated by arrow DR1. Rotating electric machines 100 and 200 are formed integrally in unitary case 12 in the present embodiment.

The productivity of drive unit 1 can be improved in accordance with the configuration of FIG. 8, likewise the first to third embodiments.

Fifth Embodiment

Figure 9:
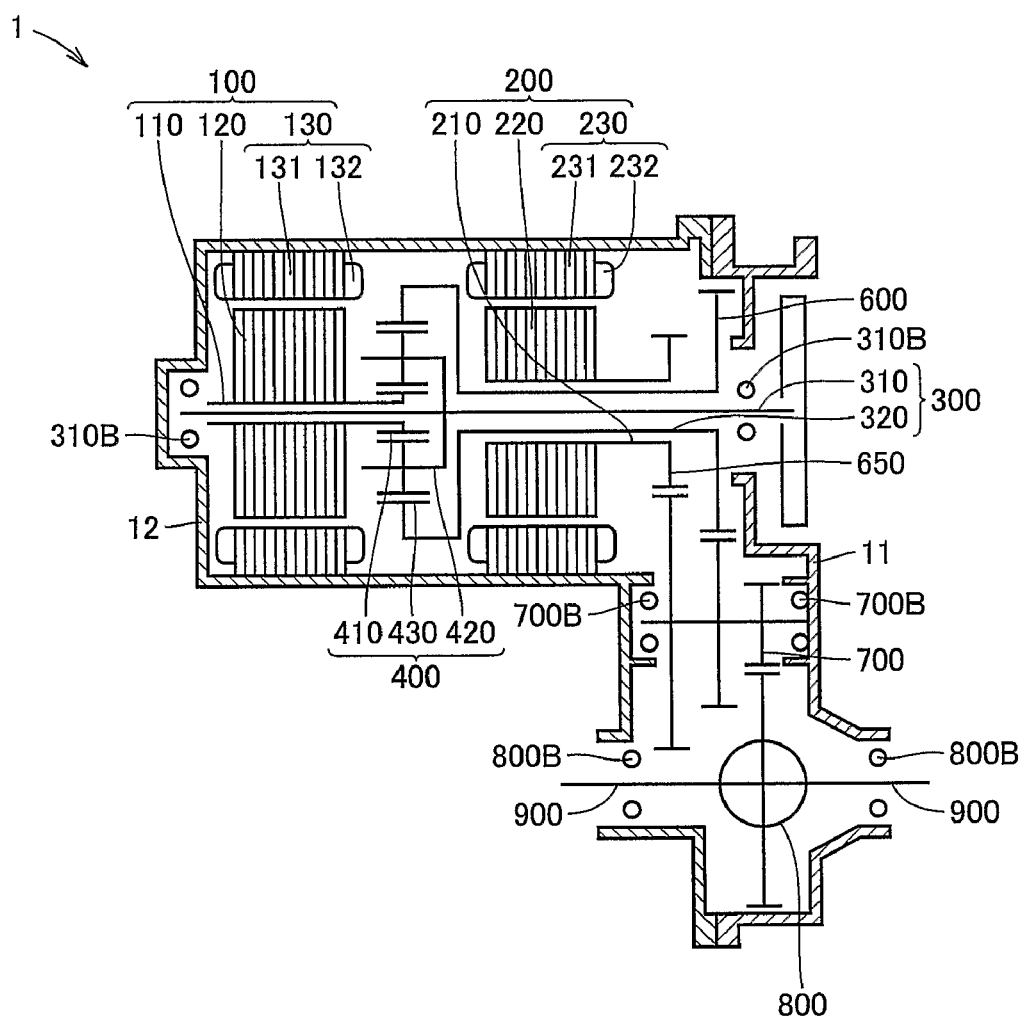

Referring to FIG. 9, drive unit 1 of the fifth embodiment is a modification of drive unit 1 of the first to fourth embodiments, and is characterized in that the output from planetary gear 400 identified as the power split device and the output from rotating electric machine 200 are transmitted individually to gears 600 and 700 identified as the power output unit. Specifically, the example of FIG. 9 represents that the output from ring gear 430 in planetary gear 400 is transmitted to gear 600 identified as the power output unit via output shaft 320 whereas the output from rotation shaft 210 of rotating electric machine 200 is transmitted to gear 700 identified as the power output unit via gear 650 constituting the reduction mechanism. By such a configuration, the torque ratio of the power split device to the reduction mechanism and the reduction gear ratio for the entire power conversion unit can be set arbitrarily.

Figure 10:
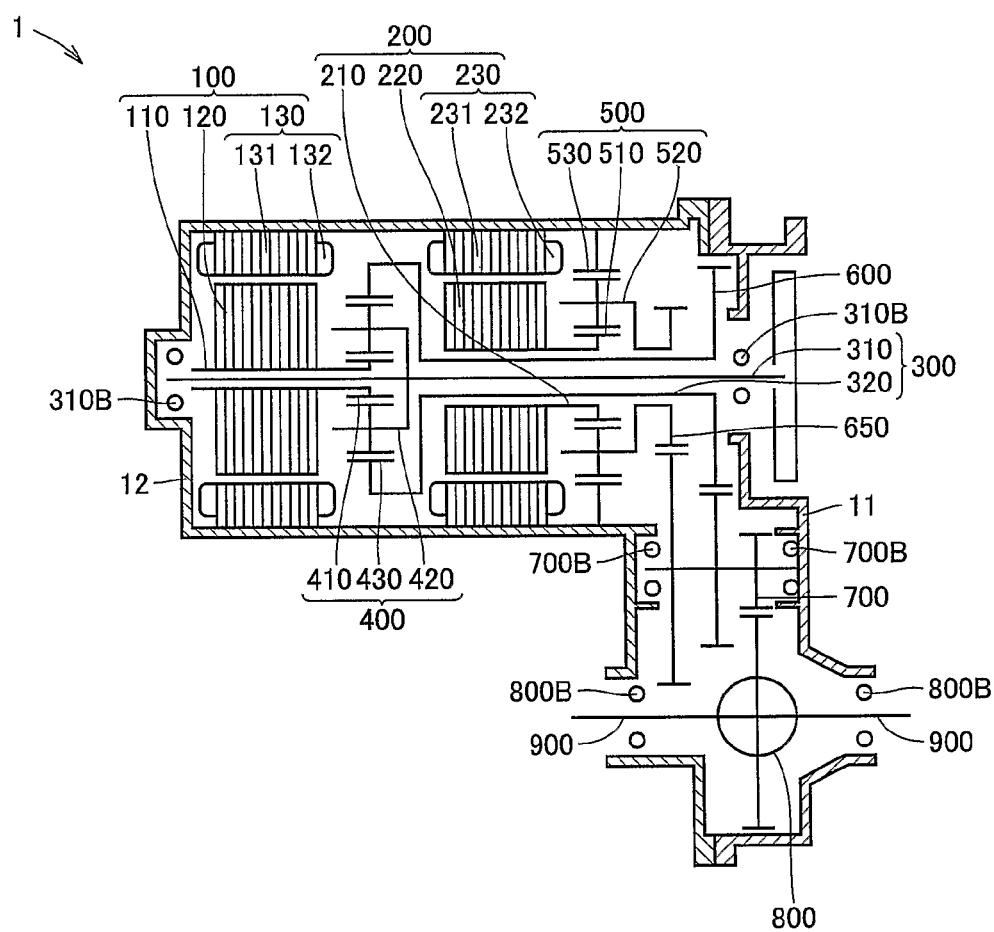
FIG. 10 is a sectional view of a modification of the power transmission apparatus of a hybrid vehicle of the fifth embodiment.

FIG. 10 is a sectional view of a modification of drive unit 1 of the fifth embodiment. In the present modification, the output from rotation shaft 210 of rotating electric machine 200 is transmitted to gear 650 via planetary gear 500. By the configuration of planetary gear 500 and gear 650 constituting the reduction mechanism of rotating electric machine 200, a higher reduction gear ratio can be achieved.

The productivity of drive unit 1 can be improved in accordance with the configurations of FIGS. 9 and 10, likewise the first to fourth embodiments.

Sixth Embodiment

Figure 11:
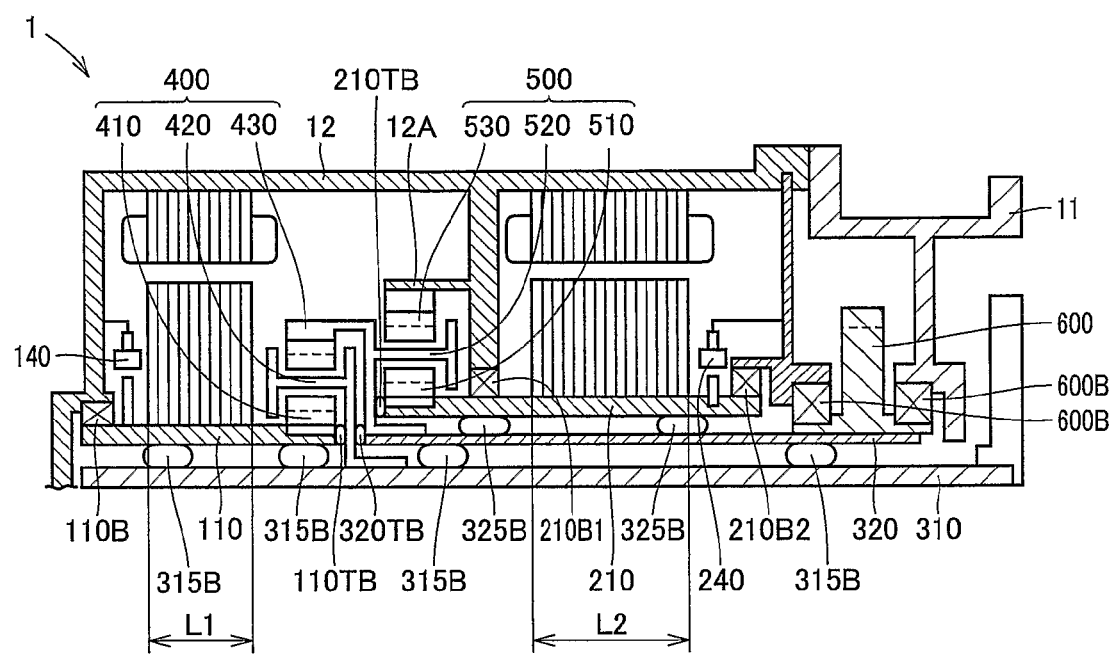
FIG. 11 is a sectional view of a power transmission apparatus of a hybrid vehicle according to a sixth embodiment of the present invention.

Referring to FIG. 11, drive unit 1 of the sixth embodiment is a modification of drive unit 1 of the first embodiment, and is characterized in that the shaft support mechanism in the direction of the diameter of the shaft differs from the mechanism in the first embodiment.

In the sixth embodiment, rotation shaft 110 has one end directly supported by case 12 via bearing 110B attached to case 12. In other words, bearing 110B is provided between rotation shaft 110 and case 12. Further, rotation shaft 210 is directly supported by case 12 via bearings 210B1 and 210B2 attached to case 12. In other words, bearings 210B1 and 210B2 are provided between rotation shaft 210 and case 12.

By providing bearings 315B and 325B between input shaft 310 and rotation shafts 110 and 210, the centrifugal force by the rotation of rotors 130 and 230 and the weight of rotors 130 and 230 act on input shaft 310 as external force. The external force from rotors 130 and 230 becomes greater in proportion to a higher rotational speed of rotors 130 and 230. If the diameter of input shaft 310 is increased in order to ensure the strength of input shaft 310, the outer diameter of the planetary gear and/or rotation sensor will also become greater to become a factor in increasing the size of drive unit 1. Restricting the rotational speed of rotors 130 and 230, however, may induce power-down.

A rotating electric machine having an output greater than that of rotating electric machine 100 that generates power mainly based on the motive power from the engine is employed as rotating electric machine 200 that generates the motive power to drive the vehicle. Therefore, the employed rotating electric machine 200 is larger than rotating electric machine 100 (for example, longer axial length (L2>L1) when of the same diameter as shown in FIG. 11). This means that the vibration of rotating electric machine 200 tends to become greater than the vibration of rotating electric machine 100. Therefore, it is particularly important to reduce the external force acting on input shaft 310 from rotor 230.

In view of the foregoing, the present embodiment has the external force acting on input shaft 310 from rotation shaft 210 reduced by directly supporting rotation shaft 210 on case 12 via bearings 210B1 and 210B2. Therefore, the maximum rotational speed of rotating electric machine 200 can be increased while suppressing excessive increase in the diameter of input shaft 310.

Rotation shaft 110 has only one end directly supported by case 12. The other end of rotation shaft 110 is supported indirectly by case 12 via input shaft 310 and the like. Although the effect is restricted as compared to the case where a plurality of regions of the shaft is directly supported by case 12, a similar advantage can be achieved, likewise rotation shaft 210.

In the example of FIG. 11, bearing 210B1 is provided at a projection 12A protruding from the inner wall of case 12 at a region between rotating electric machines 100 and 200. Provision of such a projection 12A is advantageous in that the rigidity of case 12 is improved and the noise during the drive of drive unit 1 is reduced.

In the example of FIG. 11, ring gear 530 is affixed to projection 12A. This is advantageous in that the noise in drive unit 1 during operation thereof is further reduced.

Although rotation shafts 110 and 210 are both supported by case 12 in the example of FIG. 11, only one of rotation shafts 110 and 210 may be supported by case 12.

The invention may be practiced otherwise than as specifically described, and it will be understood that the characterizing features of each of the embodiments set forth above can be combined appropriately. For example, the configuration of the sixth embodiment can be applied to the drive unit of the second to fifth embodiments.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

Thus the present invention is applicable to a power transmission apparatus of a hybrid vehicle.

The invention claimed is:

1. A power transmission apparatus of a hybrid vehicle comprising:
    an input shaft connected to an internal combustion engine,
    a power conversion unit including first and second rotating electric machines aligned in an axial direction and a planetary gear to convert power applied from said input shaft, and
    a power output unit transmitting power output from said power conversion unit to a drive shaft of the vehicle, wherein
    said power conversion unit is formed separately from said power output unit,
    said first and second rotating electric machines of said power conversion unit are stored in a unitary housing,
    said first and second rotating electric machines both can be inserted into said housing from a direction distant from said internal combustion engine,
    said first rotating electric machine includes a first rotation shaft,
    said second rotating electric machine includes a second rotation shaft,
    said input shaft is arranged at an inner circumferential side of said first and second rotation shafts,
    a first bearing supporting said first rotation shaft is provided between an outer circumferential face of said input shaft and an inner circumferential face of said first rotation shaft,
    a second bearing supporting said second rotation shaft is provided between the outer circumferential face of said input shaft and an inner circumferential face of said second rotation shaft, and
    said first and second rotation shafts are supported, in the direction of a diameter thereof, to said housing through said input shaft.

2. The power transmission apparatus of a hybrid vehicle according to claim 1, wherein said power output unit is arranged between said internal combustion engine and said power conversion unit.

3. The power transmission apparatus of a hybrid vehicle according to claim 1, further comprising another bearing provided between said housing and at least one of said first and second rotation shafts.

4. The power transmission apparatus of a hybrid vehicle according to claim 3, wherein said housing includes a projection protruding from an inner wall of said housing at a site between said first and second rotating electric machines, and said another bearing is provided at said projection.

5. The power transmission apparatus of a hybrid vehicle according to claim 1, wherein
    said first and second rotation shafts have a straight configuration, and
    said first and second rotation shafts and rotors of said first and second rotating electric machines are spline-fitted, respectively.

6. The power transmission apparatus of a hybrid vehicle according to claim 1, wherein said power conversion unit includes a power split device including said planetary gear, and a reduction mechanism,
    said planetary gear being connected to said input shaft, said first rotating electric machine, and said power output unit,
    said reduction mechanism being provided at a power transmission path between said second rotating electric machine and said power output unit.

7. The power transmission apparatus of a hybrid vehicle according to claim 6, wherein a planetary carrier of said planetary gear in said power split device is connected to said input shaft, and a ring gear of said planetary gear is connected to said power output unit.

8. The power transmission apparatus of a hybrid vehicle according to claim 6, wherein a ring gear of said planetary gear in said power split device is connected to said input shaft, and a planetary carrier of said planetary gear is connected to said power output unit.

9. The power transmission apparatus of a hybrid vehicle according to claim 6, wherein said reduction mechanism includes another planetary gear, said another planetary gear being affixed to said housing at an axial central region of said power conversion unit.

10. The power transmission apparatus of a hybrid vehicle according to claim 6, wherein said reduction mechanism includes another planetary gear, a ring gear of said another planetary gear being affixed to said housing.

11. The power transmission apparatus of a hybrid vehicle according to claim 6, wherein an output of said power split device and an output of said reduction mechanism are transmitted individually to said power output unit.

12. The power transmission apparatus of a hybrid vehicle according to claim 1, further comprising an output shaft connected to said planetary gear and said power output unit, and provided concentric with said input shaft.

13. The power transmission apparatus of a hybrid vehicle according to claim 1, further comprising:

an output shaft; and a third bearing supporting said output shaft, wherein said third bearing supporting said output shaft is provided between the outer circumferential face of said input shaft and an inner circumferential face of said output shaft, and said second bearing supporting said second rotation shaft is being provided between an outer circumferential face of said output shaft and said inner circumferential face of said second rotation shaft.

* * * * *